US009284453B2

(12) United States Patent
Lee et al.

(10) Patent No.: US 9,284,453 B2
(45) Date of Patent: Mar. 15, 2016

(54) SOLUBLE CONDUCTIVE POLYMER AND METHOD FOR PREPARING SAME

(75) Inventors: Sung-Joo Lee, Seoul (KR); Seung-Koo Cho, Gunpo-si (KR); Hong-Sup Lee, Seongnam-si (KR); Seung-Gyu Kim, Seoul (KR)

(73) Assignee: Sung-Joon Lee, Seoul (KR)

( * ) Notice: Subject to any disclaimer, the term of this patent is extended or adjusted under 35 U.S.C. 154(b) by 544 days.

(21) Appl. No.: 12/863,432

(22) PCT Filed: Jan. 16, 2009

(86) PCT No.: PCT/KR2009/000203
§ 371 (c)(1),
(2), (4) Date: Jul. 16, 2010

(87) PCT Pub. No.: WO2009/091184
PCT Pub. Date: Jul. 23, 2009

(65) Prior Publication Data
US 2011/0049432 A1 Mar. 3, 2011

(30) Foreign Application Priority Data
Jan. 17, 2008 (KR) .......................... 10-2008-0005138

(51) Int. Cl.
*H01B 1/00* (2006.01)
*C08L 79/02* (2006.01)
(Continued)

(52) U.S. Cl.
CPC ............... *C08L 79/02* (2013.01); *C08G 61/124* (2013.01); *C08G 61/126* (2013.01);
(Continued)

(58) Field of Classification Search
CPC ............................................. H01B 1/00–1/04
USPC ............ 252/500–518.1; 423/445 R; 525/533; 528/422, 487
See application file for complete search history.

(56) References Cited

U.S. PATENT DOCUMENTS 5,008,041 A 4/1991 Cameron et al.
5,232,631 A * 8/1993 Cao et al. ...................... 252/500
(Continued)

FOREIGN PATENT DOCUMENTS

CN 1696178 A 11/2005
JP H01230628 A 9/1989
(Continued)

OTHER PUBLICATIONS

Min, Gary ("Inorganic salts effect on the properties of polyaniline." Synt. Met., 119, pp. 273-274, 2001).*
(Continued)

*Primary Examiner* — Tri V Nguyen
(74) *Attorney, Agent, or Firm* — Alleman Hall McCoy Russell & Tuttle LLP

(57) ABSTRACT

Disclosed is a conductive polymer, which is doped with an acid and has a weight-average molecular weight of 5,000 or less when provided in the form of a base type, with a solubility of 3% or more in a polar organic solvent. Because the conductive polymer is soluble in various polar organic solvents, the solvent may be freely selected depending on the end use of the conductive polymer and thus the conductive polymer has a very wide range of industrial applications. A method of preparing the conductive polymer is also provided, which is simple and generates a small amount of wastewater and thus reduces the preparation cost and is environmentally friendly.

11 Claims, 6 Drawing Sheets

(51) Int. Cl.

| | | |
|---|---|---|
| *C08G 61/12* | (2006.01) | |
| *C08G 73/02* | (2006.01) | |
| *C08K 5/20* | (2006.01) | |
| *C08K 5/3415* | (2006.01) | |
| *C08K 5/41* | (2006.01) | |
| *C08L 65/00* | (2006.01) | |

(52) U.S. Cl.
  CPC ... *C08G 73/0266* (2013.01); *C08G 2261/3223* (2013.01); *C08G 2261/792* (2013.01); *C08K 5/20* (2013.01); *C08K 5/3415* (2013.01); *C08K 5/41* (2013.01); *C08L 65/00* (2013.01)

(56) References Cited

U.S. PATENT DOCUMENTS

| | | | | |
|---|---|---|---|---|
| 5,371,182 | A * | 12/1994 | Galaj et al. | 528/422 |
| 5,567,356 | A * | 10/1996 | Kinlen | 252/500 |
| 5,852,161 | A | 12/1998 | Cheng | |
| 5,993,694 | A * | 11/1999 | Ito et al. | 252/500 |
| 6,030,551 | A | 2/2000 | Ho et al. | |
| 6,194,540 | B1 * | 2/2001 | Ito et al. | 528/373 |
| 2005/0131139 | A1 * | 6/2005 | Kaner et al. | 524/800 |
| 2005/0230668 | A1 * | 10/2005 | Lee et al. | 252/500 |
| 2005/0269555 | A1 | 12/2005 | Lee et al. | |
| 2006/0122366 | A1 * | 6/2006 | Wang et al. | 528/422 |
| 2009/0072201 | A1 * | 3/2009 | Hsu et al. | 252/500 |
| 2009/0242842 | A1 * | 10/2009 | Suh et al. | 252/500 |
| 2011/0175034 | A1 * | 7/2011 | Suh et al. | 252/500 |

FOREIGN PATENT DOCUMENTS

| | | |
|---|---|---|
| JP | 8120074 A | 5/1996 |
| JP | 2005520036 A | 7/2005 |
| KR | 1020010112574 A | 12/2001 |
| KR | 1020020022509 A | 3/2002 |
| KR | 20030039153 A | 5/2003 |
| KR | 1020060011117 A | 2/2006 |
| KR | 100840142 B1 | 6/2008 |
| WO | WO01/49773 A1 * | 7/2001 ............ C08G 73/02 |
| WO | 03080708 A1 | 10/2003 |
| WO | 2007013787 A1 | 2/2007 |

OTHER PUBLICATIONS

Shreepathi, Subrahmanya and Rudolph Holze, "Spectroelectrochemical Investigations of Soluble Polyaniline Synthesized via New Inverse Emulsion Pathway," Published on Web Jul. 15, 2005, Chemistry of Materials, 17, 4078-4085, 8 pages.

Office Action of Korean Application No. 10-2009-0003579, Issued Jan. 10, 2011, Korean Patent Office, 9 pages.

MacDiarmid, A.G. et al., "Polyaniline: A New Concept in Conducting Polymers," Synthetic Metals, 18 (1987) 285-290, 6 pages.

Lee, J.Y. et al., "Synthesis of Soluble Polypyrrole of the Doped State in Organic Solvents," Synthetic Metals, 74 (May 1995) 103-106, 4 pages.

Mattoso, Luiz H.C. et al., "Controlled Synthesis of High Molecular Weight Polyaniline and Poly (o-methoxyaniline)," Sunthetic Metals, 68 (Jul. 1994) 1-11, 11 pages.

Oh, Eung Ju et al., "High Molecular Weight Soluble Polypurrole," Synthetic Metals, 125 (2002) 267-272, 6 pages.

Jang, Kwan Sik et al., "Chemical Synthesis and Characterization of Soluble Polypyrrole," Doctoral Thesis, Department of Chemistry of Myong Ji University Graduate School, 2001, 177 pages.

Office Action of Chinese Patent Application No. 200980105486.2, Dec. 21, 2011, 11 pages, State Intellectual Property Office of P.R. China.

IDS European Patent Office, Search Report of EP09703080.3, Jan. 27, 2012, Germany, 7 pages.

* cited by examiner

SOLUBLE CONDUCTIVE POLYMER AND METHOD FOR PREPARING SAME

TECHNICAL FIELD

The present invention relates to a soluble conductive polymer and a method of preparing the same, and more particularly to a conductive polymer having low molecular weight, which is prepared using a synthesis process that controls molecular weight, thus being efficiently soluble in various polar organic solvents, and to a method of preparing such a conductive polymer.

BACKGROUND ART

Generally, polyaniline is prepared in the form of base type polyaniline by reacting an aniline monomer with an oxidizer in the presence of a hydrochloric acid aqueous solution or a sulfuric acid aqueous solution thus obtaining a polyaniline salt and then neutralizing the polyaniline salt with a base. The base type polyaniline which is a nonconductor is imparted with conductivity only when doped again with an acid. The conductive polyaniline thus prepared does not dissolve in most organic solvents and does not fuse even when heated, resulting in poor processability. Also, the preparation process of the conductive polyaniline generates a large amount of wastewater due to the aqueous solution treatment, undesirably causing serious environmental contamination.

In order to solve such problems, various attempts have been made. In this regard, there are first disclosed methods of doping polyaniline with camphor sulfonic acid thus dissolving the doped polyaniline in m-cresol because polyaniline doped with an acid having a simple structure such as sulfuric acid or hydrochloric acid is difficult to dissolve. In addition, methods of doping a polymer using various acids thus dissolving the polymer in m-cresol are disclosed, but the industrial use thereof is restricted because of the high toxicity of m-cresol. Furthermore, methods of attaching a substituent to an aromatic ring of aniline to increase solubility are disclosed. Although these methods increase solubility, problems of conductivity being decreased and the preparation cost being increased occur, and wastewater is still generated.

MacDiarmid et al. (A. G. MacDiarmid et. al., "Polyaniline: A New Concept in Conducting Polymers", Synthetic Metals. 18 (1987), pp 285-290) describes the results of observing the changes in conductivity of polyaniline obtained by de-doping polyaniline synthesized in the presence of a hydrochloric acid aqueous solution thus preparing base type polyaniline and then doping the base type polyaniline with various acids. However, this method is disadvantageous because the kind of acid usable as a dopant is limited, and the there is a limited number of solvents able to dissolve the conductive polymer.

Polypyrrole is typically prepared by polymerizing a pyrrole monomer with an oxidizer in the presence of an acid aqueous solution. However, because this polypyrrole is not dissolved in water or an organic solvent, the industrial use thereof is difficult. Also, Lee Jin-Young et al. (J. Y. Lee D. Y. Kim, and C. Y. Kim, Synthetic Metals 74 (1995), p 103) describes polypyrrole which is soluble in m-cresol, tetrahydrofuran (THF) or dimethylformamide (DMF) using dodecylbenzenesulfonic acid (HDBSA) as a dopant. However, the preparation of this polymer is disadvantageous because the dopant only includes dodecylbenzenesulfonic acid, the solvent able to dissolve the polymer is merely exemplified by m-cresol, tetrahydrofuran (THF) or dimethylformamide (DMF), and the solubility of the polymer is also limited.

It is known that polymers such as polythiophene, poly(p-phenylene), poly(p-phenylenevinylene) and so on, which are obtained using the synthesis methods reported to date, seldom dissolve in water or organic solvents.

U.S. Pat. No. 5,567,356 discloses an emulsion polymerization method, but is problematic because an excess of dopant remains in the organic solvent layer and the conductivity is low. Also, Korean Patent No. 10-0633031 discloses a method of increasing solubility using a dopant mixture, but is disadvantageous because the organic solvent layer and the water layer should be separated from each other, a dopant mixture which is expensive should be used, and there is not a variety of kinds of dopants. Furthermore, when a dopant having a complicated structure is present in a large amount in the organic solvent layer, and is removed, a large amount of wastewater may be undesirably generated.

Conductive polymers have a large variety of uses in the industrial field. However, the conventional conductive polymer is difficult to apply to various end uses because it dissolves in a minimum number of a specific organic solvent only when doped with a specific dopant as mentioned above. The main reason why the conventional conductive polymer has the above problems is considered to be due to the large molecular weight of the doped conductive polymer.

Generally, the synthesis of conductive polymers is carried out in a solvent including a considerable amount of water. The conductive polymer thus synthesized is reported to have a weight-average molecular weight of at least 10,000.

Specifically, Mattoso et al. ("Controlled Synthesis of High Molecular Weight Polyaniline and Poly(o-methoxyaniline", L. H. C. Mattoso, A. G. MacDiarmid and A. J Epstein, Synthetic Metals, 68 (1994) pp 1-11) describes polyaniline having a weight-average molecular weight of about 53,000, synthesized in the presence of a hydrochloric acid aqueous solution at 0° C., and polyaniline having a weight-average molecular weight controlled to the range of 36,900~384,900 under conditions in which the temperature is changed to be lower than 0° and the reaction catalyst is changed.

Korean Patent No. 10-0373926 (patentee: Smart Teck Co. Ltd., Inventor: Lee Sung-Joo) discloses polyaniline having a weight-average molecular weight of at least 10,000, synthesized in the presence of an acidic aqueous solution.

E. J. Oh et al. ("High Molecular Weight Soluble Polypyrrole", E. J. Oh, K. S. Jang and A. G. MacDiarmid, Synthetic Metals, 125 (2002), pp 267-272) describes polypyrrole having a weight-average molecular weight of 62,296, synthesized by reacting a pyrrole monomer and sodium di(2-ethylhexyl)sulfosuccinate with ammonium persulfate in the presence of an aqueous solution at 0° C.

Jang Kwan-Sic (doctoral thesis, Department of Chemistry of Myong Ji University Graduate School, 2001) describes polypyrrole having a weight-average molecular weight of 10,000 or more, synthesized in the presence of an acid aqueous solution.

Also, Korean Unexamined Patent Publication No. 2001-0112574 discloses polypyrrole having a weight-average molecular weight of about 13,441, synthesized through an oxidation reaction using dodecylbenzoic acid and polypyrrole at 0° C. in the presence of an aqueous solution as mentioned above by Lee Jin-Young et al.

Based on the aforementioned theoretical grounds, in order that the conductive polymer doped with various dopants be able to be efficiently dissolved in various organic solvents, there is a need to synthesize a conductive polymer which has a weight-average molecular weight remarkably lower than the currently typical level (weight-average molecular weight: 10,000 or more).

DISCLOSURE

Technical Problem

Accordingly, the present invention has been made keeping in mind the above problems encountered in the related art, and the present invention is intended to provide a low molecular weight conductive polymer (weight-average molecular weight: 5,000 or less), which is soluble in a typical polar organic solvent and is doped with various acids.

Also the present invention is intended to provide a method of simply and in an environmentally friendly manner preparing the low molecular weight conductive polymer.

Technical Solution

An aspect of the present invention provides a conductive polymer, which is doped with an acid and has a weight-average molecular weight of 5,000 or less when provided in the form of a base type, with a solubility of 3% or more in an organic solvent.

Another aspect of the present invention provides a method of preparing the conductive polymer, including dissolving a monomer of a conductive polymer in an organic solvent thus obtaining a monomer solution, adding water to the monomer solution in an amount ranging from more than 0 parts by weight to 10 parts by weight based on 100 parts by weight of the organic solvent, adding a dopant and an oxidizer to the monomer solution in a random sequence so that respective reactions take place thus obtaining a reaction mixture, and filtering the reaction mixture to yield a conductive polymer solution.

ADVANTAGEOUS EFFECTS

According to the present invention, a conductive polymer which is doped with an acid has low molecular weight and is thus soluble in various polar organic solvents. Hence, it is possible to freely select the solvent depending on the end use of the conductive polymer and the conductive polymer has a very wide range of industrial applications. Furthermore, because an acid which has a simple structure and is inexpensive is used as a dopant, the preparation cost is low.

Also, according to the present invention, a method of preparing the conductive polymer enables the synthesis of a conductive polymer having a low molecular weight (weight-average molecular weight: 5,000 or less) because a monomer is polymerized in the presence of a small amount of water and an organic solvent. Furthermore, because the acid which has a simple structure and is inexpensive is used as a dopant, the dopant seldom remains, thus obviating a need to perform a purification process and generating a small amount of wastewater, resulting in reduced preparation cost and environmentally friendly effects.

BEST MODE

Figure 1:
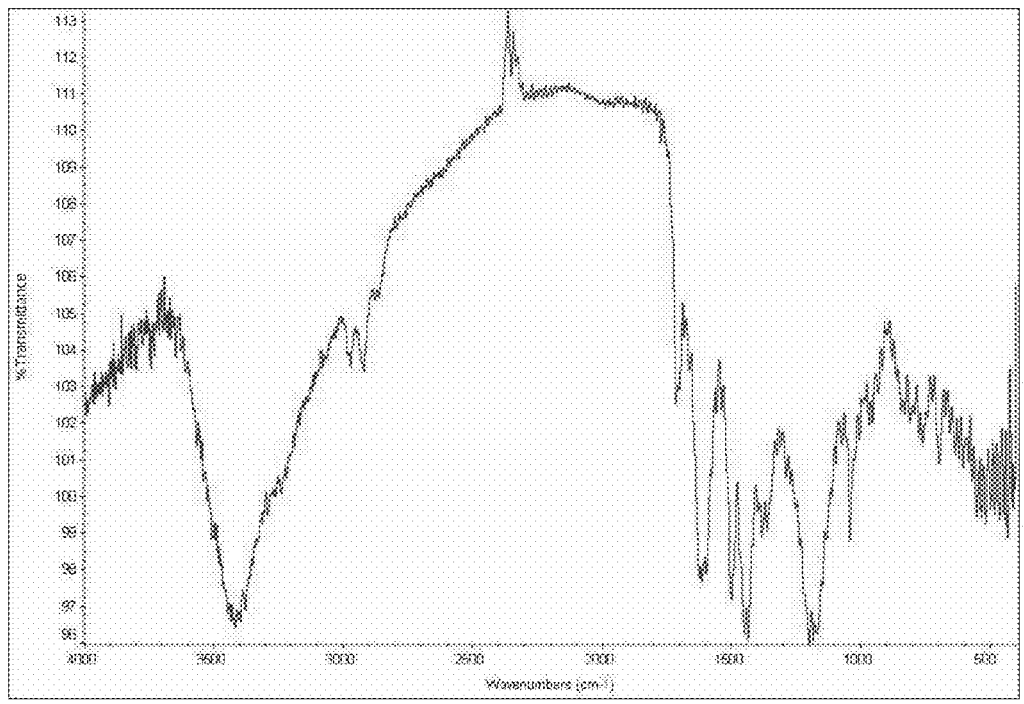
FIG. 1 is an FT-IR spectrum of base type polyaniline obtained by neutralizing a conductive polyaniline solution synthesized using the process of the present invention with ammonia water and then drying it.

The present invention pertains to a conductive polymer which is doped with an acid and has a weight-average molecular weight of 5,000 or less when provided in the form of a base type, with a solubility of 3% or more in a polar organic solvent.

In the present invention, the conductive polymer having the above properties may include polyaniline, polypyrrole or polythiophene.

In the case where the conductive polymer is polypyrrole, it may be prepared in the form of a base type having a weight-average molecular weight less than 3,000 in order to increase the solubility.

Examples of the acid used as the dopant in the conductive polymer according to the present invention may include sulfuric acid, hydrochloric acid, phosphoric acid, chlorosulfonic acid, methane sulfonic acid, sulfamic acid, nitric acid, dodecylbenzenesulfonic acid, camphor sulfonic acid, toluene sulfonic acid, naphthalene sulfonic acid, formic acid, polystyrenesulfonic acid, benzenesulfonic acid, oxalic acid, diphenylsulfone sulfonic acid, benzoic acid, and anthraquinonesulfonic acid, which may be used alone or in combinations of two or more.

In this field, the sulfate, methanesulfonate, chlorosulfonate, hydrochloride or phosphate of the conductive polymer is known to be insoluble in organic solvents. Also, the kinds of solvents which dissolve the salt of the conductive polymer using another acid are known to be very limited.

However, in the present invention, the conductive polymer salt is prepared using a process that controls molecular weight and thus has a low molecular weight and may be dissolved in various polar solvents.

In the present invention, the conductive polymer which is doped with a dopant such as sulfuric acid, hydrochloric acid, phosphoric acid, chlorosulfonic acid, methane sulfonic acid, sulfamic acid, nitric acid, dodecylbenzenesulfonic acid, camphor sulfonic acid, toluene sulfonic acid, naphthalene sulfonic acid, formic acid, polystyrene sulfonic acid, benzenesulfonic acid, oxalic acid, diphenylsulfone sulfonic acid, benzoic acid, and anthraquinone sulfonic acid may be dissolved in any organic solvent selected from among methylethylketone, chloroform, dichloromethane, N-methylpyrrolidinone (NMP), dimethylsulfoxide (DMSO), dimethylformamide (DMF), methanol, ethanol, propanol, butanol, t-butyl alcohol, isopropylalcohol (iPA, 2-propanol), benzyl alcohol, tetrahydrofuran (THF), ethyl acetate, butyl acetate, propyleneglycol diacetate, propyleneglycol methyl ether acetate (PGMEA), formic acid, acetic acid, trifluoroacetic acid, acetonitrile, trifluoroacetonitrile, ethylene glycol, dimethylacetamide (DMAC), DMAC-LiCl, N,N'-1,3-dimethyl-3,4,5,6-tetrahydro-2(1H)-pyrimmidinone (N,N'-1,3-dimethylpropyleneurea, DMPU), morpholine, pyridine, and pyrrolidine.

In the present invention, the conductive polymer doped with the acid may be prepared by dissolving a monomer of a conductive polymer in one or more organic solvents selected from among the above organic solvent group, adding water in an amount ranging from more than 0 parts by weight to 10 parts by weight based on 100 parts by weight of the organic solvent, and adding a dopant and an oxidizer.

Because the conductive polymer according to the present invention results from acid doping and monomer polymerization in the presence of a small amount of water and an organic solvent, the resulting base type conductive polymer has a weight-average molecular weight of 5,000 or less, and the maximum molecular weight thereof does not exceed 20,000 (in the present invention, a base type conductive polymer means that a conductive polymer doped with an acid is neutralized with a base). In particular, in the case of polypyrrole, it may be prepared to have a weight-average molecular weight of less than 3,000.

Unlike conductive polymers synthesized by a synthesis process using an acid aqueous solution or an emulsion dispersion synthesis process using an organic solvent, the conductive polymers synthesized using the organic solvent according to the present invention are advantageous because the molecular weight thereof is not greatly increased even when the reaction rate of synthesis is slow, making it possible to prepare a low molecular weight conductive polymer.

The conductive polymer according to the present invention is prepared by adding water in an amount ranging from more than 0 parts by weight to 10 parts by weight based on 100 parts by weight of the organic solvent. As such, water added in the small amount makes the reaction fast. However, if the amount of water is greater than 10 parts by weight based on 100 parts by weight of the organic solvent, the conductive polymer does not dissolve in the solvent. Also, a large amount of oxidizer by-product dissolves in the water, undesirably lowering the purity of the conductive polymer solution. Furthermore, in the case where a film is manufactured using the conductive polymer solution including the oxidizer by-product, such an oxidizer by-product is contained in the film and thus absorbs moisture, undesirably deteriorating the properties of the film.

As such, water is preferably used in an amount ranging from more than 0 parts by weight to 5 parts by weight, particularly favored being from more than 0 parts by weight to 1 part by weight, based on 100 parts by weight of the organic solvent.

The amount of the dopant may be set to be within the range in which the molar ratio of the monomer of the conductive polymer to the dopant is 0.125~4.00. If the molar ratio of the monomer to the dopant is less than 0.125, the conductive polymer may become very strongly acidic and may absorb moisture. In contrast, if the molar ratio thereof exceeds 4.00, it is difficult to dope sufficiently.

In addition, the present invention pertains to a method of preparing the conductive polymer, including dissolving a monomer of a conductive polymer in an organic solvent thus obtaining a monomer solution, adding water to the monomer solution in an amount ranging from more than 0 parts by weight to 10 parts by weight based on 100 parts by weight of the organic solvent, adding a dopant and an oxidizer to the monomer solution in a random sequence so that respective reactions take place thus obtaining a reaction mixture, and filtering the reaction mixture, giving a conductive polymer solution.

The description of the conductive polymer according to the present invention is applied as it is to the method of preparing a conductive polymer according to the present invention, and the overlapping description is omitted below.

In the method according to the present invention, when the dopant and the oxidizer are added, a catalyst and a doping adjuvant may be further added so that the reaction occurs. In the present invention, the doping adjuvant indicates materials which do not directly participate in doping but are added to the conductive polymer solution and thus increase the electrical conductivity of the conductive polymer.

The catalyst and the doping adjuvant may be added in conjunction with or after addition of the dopant, and may be added before or after addition of the oxidizer regardless of the addition sequence of the dopant, so that the reaction is carried out.

Examples of the catalyst may include lithium chloride, lithium bromide, lithium iodide, lithium tetrafluoroborate, sodium chloride, sodium bromide, sodium iodide, potassium chloride, potassium bromide, potassium iodide, magnesium chloride, magnesium bromide, calcium chloride, strontium chloride, and barium chloride, which may be used alone or in combinations of two or more. The catalyst may be used in an amount of 10 wt % or less based on the total weight of the organic solvent. If the amount of the catalyst exceeds 10 wt %, the catalytic activity is not further increased.

Examples of the doping adjuvant may include N-methylpyrrolidinone (NMP), dimethylsulfoxide (DMSO), dimethylformamide (DMF), methanol, ethanol, propanol, butanol, isopropylalcohol, tetrahydrofuran (THF), ethyl acetate, and butyl acetate, which may be used alone or in combinations of two or more.

Also, when the dopant and the oxidizer are added, the addition reaction of the oxidizer may be carried out in a manner such that a first oxidizer is added thus completing the reaction, the resulting reaction product is filtered, and a second oxidizer having an oxidizing power stronger than that of the first oxidizer is added to the filtrated solution, and thus the reaction takes place.

The above reaction may be repeated as needed.

The above manner of performing the oxidizer addition reaction is useful when reacting the remaining unreacted monomer or increasing the molecular weight of a low molecular weight conductive polymer composed of two to five monomers.

Also, when the dopant and the oxidizer are added, the addition reaction of the oxidizer may be carried out in such a manner that the oxidizer is added thus completing the reaction, the resulting reaction product is filtered, and the organic solvent and the unreacted monomer of the conductive polymer are removed from the filtered solution using a distiller so that the filtered solution is concentrated to 20~50 wt %. If the solution is concentrated to less than 20 wt %, a long period of time and a large amount of energy are consumed to perform a concentration process, thus negating economic benefits. In contrast, if the solution is concentrated to exceed 50 wt %, it is difficult to expect the effects due to the concentration process. It is preferred that the filtered solution be concentrated to about 30~35 wt %.

Also, the oxidizer may be again added to the concentrated solution, so that the reaction may be further carried out.

The above manner of performing the oxidizer addition reaction may be utilized when the polymerization reaction does not proceed well. For example, when thiophene is used as the monomer, the unreacted monomer may be generated in a larger amount. In this case, the above concentration process is employed, thus facilitating the polymerization reaction.

In the method according to the present invention, the amount of the dopant may be set to be within the range in which the molar ratio of the monomer of the conductive polymer to the dopant is 0.125~4.00.

Generally when a dopant acid is added to synthesize a conductive polymer, there frequently occur cases in which the viscosity of the solution is increased and the solvent is separated thus producing a precipitate and accordingly, it is difficult to perform stirring, making it impossible to perform a synthesis procedure.

In the case where the above problems occur, the method according to the present invention may further include adding an additional organic solvent, which is not the above organic solvent which is used, in an amount of 5~30 wt % based on the total weight of the solution. When this procedure is performed, the precipitate may be dissolved and thus the viscosity of the solution is reduced, making it possible to continuously perform the synthesis of the conductive polymer.

If the additional organic solvent is used in an amount of less than 5 wt % based on the total weight of the solution, it is difficult to form a solution which enables the synthesis of the polymer. In contrast, if the amount of the additional organic solvent exceeds 30 wt %, the concentration of the solution becomes too dilute.

Herein, the additional organic solvent indicates an organic solvent which is not the same as the organic solvent which is used, and the kind thereof is not particularly limited so long as the above conditions are satisfied. For example, in the case where any one selected from the organic solvent group which will be listed later is used to synthesize a conductive polymer, one or more selected from the organic solvent group, which are different from the organic solvent which is used, may be used.

In the method according to the present invention, the monomer of the conductive polymer may include substituted or unsubstituted aniline, substituted or unsubstituted pyrrole, and substituted or unsubstituted thiophene. The substituted aniline, pyrrole or thiophene means that the aromatic ring of aniline, pyrrole or thiophene is substituted with one or more substituents known in the art. Examples of the substituted aniline, pyrrole or thiophene are represented below.

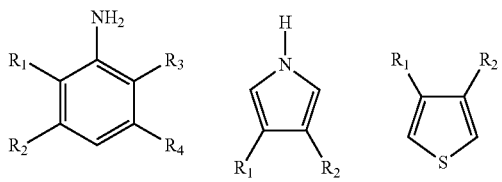

In the above formulas, $R_1$, $R_2$, $R_3$ and $R_4$ are each independently hydrogen, a linear or branched C1~C12 alkyl group, or a linear or branched C1~C12 alkoxy group.

In the method according to the present invention, examples of the organic solvent may include methylethylketone, chloroform, dichloromethane, N-methylpyrrolidinone (NMP), dimethylsulfoxide (DMSO), dimethylformamide (DMF), methanol, ethanol, propanol, butanol, t-butyl alcohol, isopropylalcohol (iPA, 2-propanol), benzyl alcohol, tetrahydrofuran (THF), ethyl acetate, butyl acetate, propylene glycol diacetate, propylene glycol methyl ether acetate (PGMEA), formic acid, acetic acid, trifluoroacetic acid, acetonitrile, trifluoroacetonitrile, ethylene glycol, dimethylacetamide (DMAC), DMAC-LiCl, N,N'-1,3-dimethyl-3,4,5,6-tetrahydro-2(1H)-pyrimmidinone (N,N'-1,3-dimethylpropyleneurea, DMPU), morpholine, pyridine, and pyrrolidine, which may be used alone or in combinations of two or more.

Particularly useful as the organic solvent is methylethylketone. Because methylethylketone does not dissolve an oxidizer by-product such as ammonium persulfate or potassium permanganate, it may simplify the preparation process of the conductive polymer and is very effective.

In the method according to the present invention, examples of the dopant may include sulfuric acid, hydrochloric acid, phosphoric acid, chlorosulfonic acid, methane sulfonic acid, sulfamic acid, nitric acid, dodecylbenzenesulfonic acid, camphor sulfonic acid, toluene sulfonic acid, naphthalene sulfonic acid, formic acid, polystyrene sulfonic acid, benzene sulfonic acid, oxalic acid, diphenylsulfone sulfonic acid, benzoic acid, and anthraquinone sulfonic acid, which may be used alone or in combinations of two or more.

In the method according to the present invention, each of the oxidizer, the first oxidizer and the second oxidizer may include one or more selected from the group consisting of ammonium persulfate, ammonium iron(III) sulfate (III), iron (III) sulfate, iron(III) chloride, iron(III) perchlorate, iron(III) p-toluenesulfonate, potassium permanganate, potassium dichromate, and iron(III) tritoluenesulfonate ($Fe(OTs)_3$).

MODE FOR INVENTION

A better understanding of the present invention may be obtained through the following examples which are set forth to illustrate, but are not to be construed as limiting the present invention.

EXAMPLE 1

Preparation of Conductive Polymer Polyaniline and Formation of Conductive Film Using the Same A 0.2 mol aniline monomer was placed in an Erlenmeyer flask containing 600 ml of methylethylketone at room temperature and stirred using a magnetic stirrer. This solution was added to 0.1 mol sulfuric acid as a dopant, stirred for 30 min, added to 0.25 mol ammonium persulfate $((NH_4)_2S_2O_8)$ and reacted for 48 hours or longer (when the viscosity of the solution was increased and thus the precipitate was produced, 5 wt % or more of an additional solvent which was not methylethylketone was added based on the total weight of the solution, thus enabling stirring). The reaction solution was filtered, yielding a conductive polymer solution.

Using this conductive polymer solution, a film was manufactured and its electrical conductivity, transmittance and sheet resistance were measured. The results were that the film had an electrical conductivity of $10^{-4}$ S/cm, and a sheet resistance of $10^9$ Ω/sq at a transmittance of 90% or more.

The conductive polymer solution was dried to remove the solvent, giving conductive polymer powder. Even in the case where the conductive polymer powder was provided again in a solution phase by performing addition of 600 ml of methylethylketone, stirring for 48 hours and filtration, the same conductive polymer solution as before drying of the conductive polymer solution to remove the solvent could be obtained.

EXAMPLE 2

Preparation of Conductive Polymer Polyaniline and Formation of Conductive Film Using the Same A 0.2 mol aniline monomer was placed in an Erlenmeyer flask containing 600 ml of methylethylketone at room temperature and stirred using a magnetic stirrer. This solution was added to 10 ml of water and 0.1 mol sulfuric acid as a dopant, further added to 10 ml of N-methylpyrrolidinone (NMP) as a doping adjuvant, stirred for 30 min, added to 0.25 mol ammonium persulfate ($(NH_4)_2S_2O_8$) and then reacted for 24 hours or longer (when the viscosity of the solution was increased and thus the precipitate was produced, 5 wt % or more of an additional solvent which was not methylethylketone was added based on the total weight of the solution, thus enabling stirring). The reaction solution was filtered, yielding a conductive polymer solution.

Using this conductive polymer solution, a film was manufactured and its electrical conductivity, transmittance and sheet resistance were measured. The results were that the film had an electrical conductivity of 10 S/cm in maximum, and a sheet resistance of $10^5$ Ω/sq or less at a transmittance of 90% or more.

EXAMPLE 3

Preparation of Conductive Polymer Polyaniline and Formation of Conductive Film Using the Same A conductive polymer solution was prepared in the same manner as in Example 2, with the exception that 10 ml of a doping adjuvant selected from the group consisting of dimethylsulfoxide (DMSO), dimethylformamide (DMF), methanol, ethanol, propanol, butanol, isopropylalcohol, tetrahydrofuran (THF), ethyl acetate and butyl acetate was used instead of 10 ml of NMP. Using the conductive polymer solution thus prepared, a film was manufactured, and the electrical conductivity, transmittance and sheet resistance of the film were almost the same as those when using 10 ml of NMP as the doping adjuvant.

EXAMPLE 4

Preparation of Conductive Polymer Polyaniline and Formation of Conductive Film Using the Same A conductive polymer solution was prepared in the same manner as in Example 2, with the exception that 0.1 mol methanesulfonic acid was used as the dopant instead of 0.1 mol sulfuric acid. Using the conductive polymer solution thus prepared, a film was manufactured, and the electrical conductivity, transmittance and sheet resistance of the film were almost the same as those when using sulfuric acid as the dopant.

EXAMPLE 5

Preparation of Conductive Polymer Polyaniline and Formation of Conductive Film Using the Same A 0.2 mol aniline monomer was placed in an Erlenmeyer flask containing 600 ml of methylethylketone at room temperature and stirred using a magnetic stirrer. This solution was added to 10 ml of water and 0.25 mol ammonium persulfate ($(NH_4)_2S_2O_8$) and then reacted for 48 hours or longer. The reaction solution was filtered thus obtaining a base type conductive polymer solution. This solution was added to 0.1 mol sulfuric acid as a dopant, stirred for 24 hours and filtered, yielding a conductive polymer solution (when the viscosity of the solution was increased and thus the precipitate was produced, 5 wt % or more of an additional solvent which was not methylethylketone was added based on the total weight of the solution, thus enabling stirring).

Using this conductive polymer solution, a film was manufactured and its electrical conductivity, transmittance and sheet resistance thereof were measured. The results were that the film had an electrical conductivity of 10 S/cm in maximum, and a sheet resistance of $10^5$ Ω/sq or less at a transmittance of 90% or more.

EXAMPLE 6

Preparation of Conductive Polymer Polyaniline and Formation of Conductive Film Using the Same A 0.2 mol aniline monomer was placed in an Erlenmeyer flask containing 600 ml of methylethylketone at room temperature and stirred using a magnetic stirrer. This solution was added to 5 ml of water and 0.25 mol ammonium persulfate ($(NH_4)_2S_2O_8$) and then reacted for 48 hours or longer. The reaction solution was filtered thus obtaining a base type conductive polymer solution. This solution was further added to 0.05 mol $KMnO_4$, reacted for 24 hours and then filtered, thus obtaining a base type conductive polymer solution. This solution was added to 0.1 mol sulfuric acid as a dopant. The resulting solution was added to 10 ml of ethanol and stirred for 24 hours or longer (when the viscosity of the solution was increased and thus the precipitate was produced, 5 wt % or more of an additional solvent which was not methylethylketone was added based on the total weight of the solution, thus enabling stirring). This solution was filtered, yielding a conductive polymer solution.

Using this conductive polymer solution, a film was manufactured and its electrical conductivity, transmittance and sheet resistance were measured. The results were that the film had an electrical conductivity of 100 S/cm in maximum, and a sheet resistance of $10^5$ Ω/sq or less at a transmittance of 90% or more.

EXAMPLE 7

Preparation of Conductive Polymer Polypyrrole and Formation of Conductive Film Using the Same A 0.2 mol pyrrole monomer was placed in an Erlenmeyer flask containing 600 ml of methylethylketone at room temperature and stirred using a magnetic stirrer. This solution was added to 10 ml of water and 0.25 mol ammonium persulfate ($(NH_4)_2S_2O_8$) and then reacted for 48 hours or longer. The reaction solution was filtered thus obtaining a base type conductive polymer solution. This solution was added to 10 ml of NMP, stirred for 1 hour, added to 0.1 mol sulfuric acid as a dopant, further stirred for 24 hours and then filtered, yielding a conductive polymer solution (when the viscosity of the solution was increased and thus the precipitate was produced, 5 wt % or more of an additional solvent which was not methylethylketone was added based on the total weight of the solution, thus enabling stirring).

Using this conductive polymer solution, a film was manufactured and its electrical conductivity, transmittance and sheet resistance were measured. The results were that the film had an electrical conductivity of 10 S/cm, and a sheet resistance of $10^5$ Ω/sq at a transmittance of 90% or more.

EXAMPLE 8

Preparation of Conductive Polymer Polypyrrole and Formation of Conductive Film Using the Same A conductive polymer solution was prepared in the same manner as in Example 7, with the exception that 0.1 mol chlorosulfonic acid was used as the dopant instead of 0.1 mol sulfuric acid. Using the conductive polymer solution thus prepared, a film was manufactured, and the electrical conductivity, transmittance and sheet resistance of the film were almost the same as those when using sulfuric acid as the dopant.

EXAMPLE 9

Preparation of Conductive Polymer Polypyrrole and Formation of Conductive Film Using the Same A conductive polymer solution was prepared in the same manner as in Example 7, with the exception that 10 ml of isopropylalcohol was used as the doping adjuvant instead of 10 ml of NMP. Using the conductive polymer solution thus prepared, a film was manufactured, and the electrical conductivity, transmittance and sheet resistance of the film were almost the same as those when using 10 ml of NMP as the doping adjuvant.

EXAMPLE 10

Preparation of Conductive Polymer Polypyrrole and Formation of Conductive Film Using the Same A 0.2 mol pyrrole monomer was placed in an Erlenmeyer flask containing 600 ml of methylethylketone at room temperature and stirred using a magnetic stirrer. This solution was added to 10 ml of water and 0.1 mol sulfuric acid as a dopant. This solution was added to 8 g of lithium chloride as a catalyst and 10 ml of NMP as a doping adjuvant and stirred for 30 min. The stirred solution was added to 0.25 mol ammonium persulfate (($NH_4)_2S_2O_8$) and then reacted for 24 hours or longer. The reaction solution was filtered, yielding a conductive polymer solution (when the viscosity of the solution was increased and thus the precipitate was produced, 5 wt % or more of an additional solvent which was not methylethylketone was added based on the total weight of the solution, thus enabling stirring).

Using this conductive polymer solution, a film was manufactured and its electrical conductivity, transmittance and sheet resistance were measured. The results were that the film had a maximum electrical conductivity of 100 S/cm, and a sheet resistance of $10^4$ Ω/sq or less at a transmittance of 90% or more.

Even in the case where 10 ml of a doping adjuvant selected from the group consisting of dimethylsulfoxide (DMSO), dimethylformamide (DMF), methanol, ethanol, propanol, butanol, isopropylalcohol, tetrahydrofuran (THF), ethyl acetate and butyl acetate was used instead of 10 ml of NMP, almost the same results were obtained.

EXAMPLE 11

Preparation of Conductive Polymer Polypyrrole and Formation of Conductive Film Using the Same A 0.2 mol pyrrole monomer was placed in an Erlenmeyer flask containing 600 ml of methylethylketone at room temperature and stirred using a magnetic stirrer. This solution was added to 5 ml of water and 0.25 mol ammonium persulfate (($NH_4)_2S_2O_8$), and then reacted for 48 hours or longer. The reaction solution was filtered thus obtaining a base type conductive polymer solution. This solution was added to 0.05 mol $KMnO_4$, reacted for 24 hours, and then filtered, thus obtaining a base type conductive polymer solution. This solution was added to 0.1 mol sulfuric acid as a dopant, added to 10 ml of methanol and stirred for 24 hours or longer (when the viscosity of the solution was increased and thus the precipitate was produced, 5 wt % or more of an additional solvent which was not methylethylketone was added based on the total weight of the solution, thus enabling stirring). This solution was filtered, yielding a conductive polymer solution.

Using this conductive polymer solution, a film was manufactured and its electrical conductivity, transmittance and sheet resistance were measured. The results were that the film had an electrical conductivity of 100 S/cm in maximum, and a sheet resistance of $10^5$ Ω/sq or less at a transmittance of 90% or more.

EXAMPLE 12

Preparation of Conductive Polymers Polyaniline and Polypyrrole and Formation of Conductive Film Using the Same Conductive polymer solutions were synthesized in the same manner as in Example 2 to 11, with the exception that the reaction temperature was changed from room temperature to −20° C., 0° C., 25° C. and 50° C., respectively. Even in the case where the conductive polymers were prepared at different reaction temperatures, the same results as when the conductive polymer was synthesized at room temperature were obtained.

EXAMPLE 13

Preparation of Conductive Polymer Polythiophene and Formation of Conductive Film Using the Same A 0.3 mol thiophene monomer was placed in an Erlenmeyer flask containing 600 ml of methylethylketone at room temperature and stirred using a magnetic stirrer. This solution was added to 5 ml of water and 0.1 mol sulfuric acid as a dopant. This solution was added to 8 g of lithium chloride (LiCl) as a catalyst and 10 ml of NMP as a doping adjuvant, stirred for 30 min, added to 0.3 mol ammonium persulfate (($NH_4)_2S_2O_8$) and reacted for 72 hours or longer. The reaction solution was filtered, yielding a conductive polymer solution (when the viscosity of the solution was increased and thus the precipitate was produced, 5 wt % or more of an additional solvent which was not methylethylketone was added based on the total weight of the solution, thus enabling stirring).

Using the conductive polymer solution, a film was manufactured and its electrical conductivity, transmittance and sheet resistance were measured, revealing that the film had an electrical conductivity of 100 S/cm in maximum, and a sheet resistance of $10^5$ Ω/sq or less at a transmittance of 94% or more.

(2) The conductive polymer solution was distilled at 80° C. using a distiller to remove the solvent and the unreacted thiophene, so that the solution was concentrated to 1/3 of the original weight thereof.

Using the conductive polymer solution thus concentrated, a film was manufactured, and its electrical conductivity, transmittance and sheet resistance were measured. Results of the measurement were that the film had an electrical conductivity of 100 S/cm in maximum, and a sheet resistance of $10^5$ Ω/sq or less at a transmittance of 92% or more.

(3) The conductive polymer solution concentrated to 1/3 was added to 0.05 mol potassium permanganate as an oxidizer, reacted for 24 hours, and filtered, thus obtaining a conductive polymer solution.

Using this conductive polymer solution, a film was manufactured, and its electrical conductivity, transmittance and sheet resistance were measured. The film had an electrical conductivity of 200 S/cm in maximum, and a sheet resistance of $10^4$ Ω/sq or less at a transmittance of 90% or more.

Even in the case where 10 ml of a doping adjuvant selected from the group consisting of dimethylsulfoxide (DMSO), dimethylformamide (DMF), methanol, ethanol, propanol, butanol, isopropylalcohol, tetrahydrofuran (THF), ethyl acetate and butyl acetate was used instead of 10 ml of NMP, almost the same results were obtained.

(4) Conductive polymer solutions were synthesized in the same manner as in (1), with the exception that the reaction temperature was changed from room temperature to −20° C., 0° C., 25° C. and 50° C., respectively. Even when the conductive polymers were prepared at different reaction temperatures, the same results as when the conductive polymer was synthesized at room temperature were obtained.

TEST EXAMPLE 1

Identification of Synthesized Conductive Polymer Polyaniline

The conductive polyaniline solution synthesized in Example 2 was neutralized with ammonia water, and dried thus obtaining base type polyaniline, and the FT-IR spectrum of the base type polyaniline was obtained using an FT-IR spectrometer (FIG. 1).

As shown in FIG. 1, the N—H stretching vibration peak near 3,400 cm$^{-1}$, the benzene substituent peak between 2,000 cm$^{-1}$ and 1,600 cm$^{-1}$, the C=C stretching vibration peak of the quinone ring and the benzene ring near between 1,600 cm$^{-1}$ and 1,510 cm$^{-1}$ were observed. From this, the polyaniline can be seen to have been synthesized.

Figure 2:
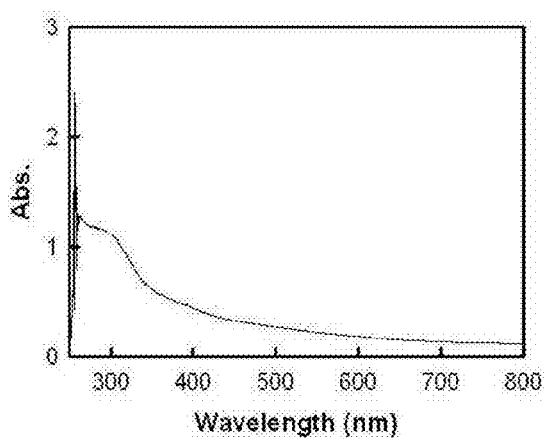
FIG. 2 is a UV-visible spectrum of base type polyaniline (solvent: N-methylpyrrolidinone) obtained by neutralizing the conductive polyaniline solution synthesized using the process of the present invention with ammonia water.

(2) The base type polyaniline was dissolved in NMP, and the UV-visible spectrum of the base type polyaniline was obtained using a UV-Visible spectrophotometer (FIG. 2).

As shown in FIG. 2, the base type polyaniline appeared in the form of a very weak peak near 370 nm, whereas the molecular exciton peak of base type polyaniline synthesized in an aqueous solution was observed at about 635 nm.

Figure 3:
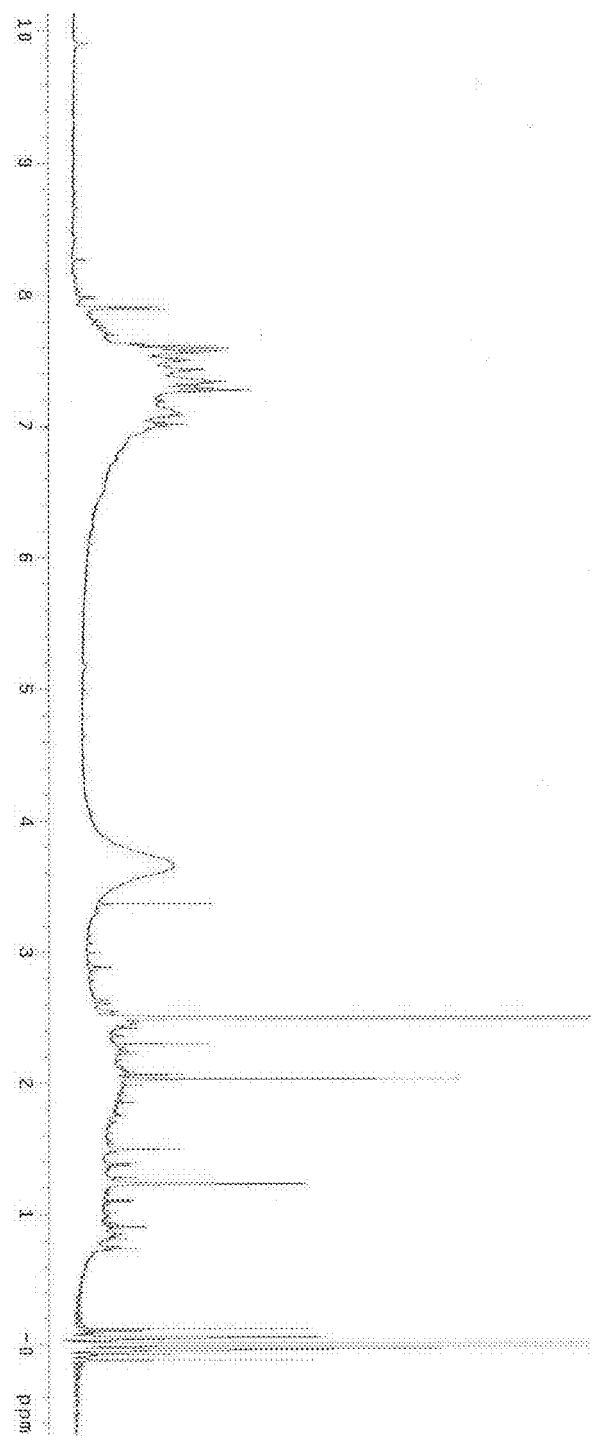
FIG. 3 is a graph showing the results of 500 MHz NMR analysis of base type polyaniline obtained by neutralizing the conductive polyaniline solution synthesized using the process of the present invention with ammonia water.

(3) The base type polyaniline was dissolved in a DMSO solution, and the NMR spectrum as shown in FIG. 3 was obtained using 500 MHz NMR.

TEST EXAMPLE 2

Identification of Synthesized Conductive Polymer Polypyrrole

Figure 4:
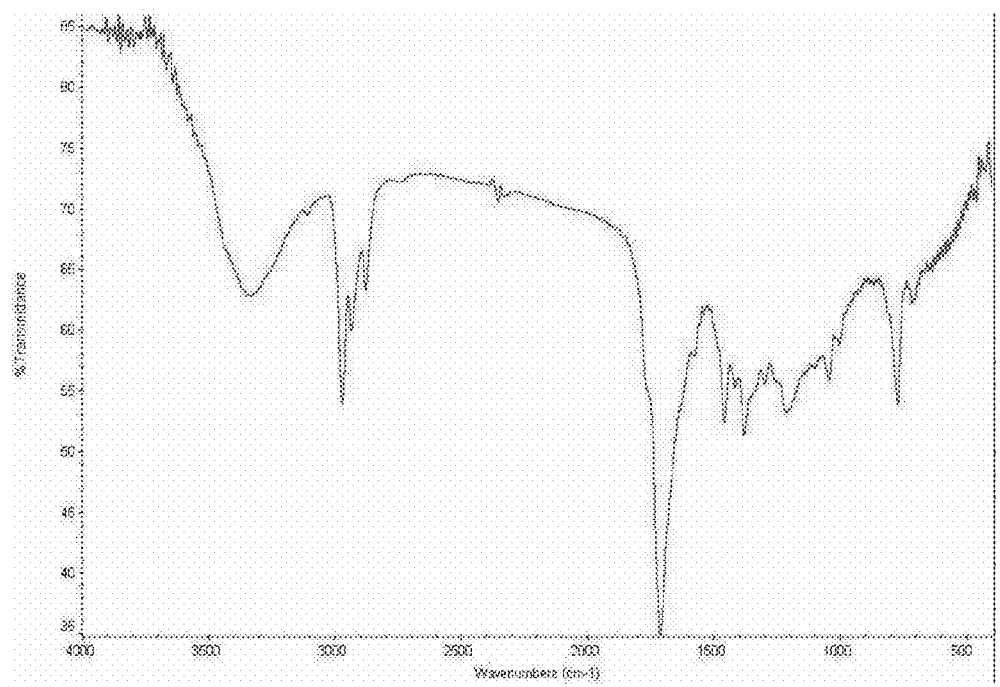
FIG. 4 is an FT-IR spectrum of base type polypyrrole obtained by neutralizing a conductive polypyrrole solution synthesized using the process of the present invention with ammonia water and then drying it.

The conductive polypyrrole solution synthesized in Example 7 was neutralized with ammonia water and dried thus obtaining base type polypyrrole, and the FT-IR spectrum of the base type polypyrrole was obtained using an FT-IR spectrometer (FIG. 4).

As shown in FIG. 4, from the C=C stretching vibration peak near 1,570 cm$^{-1}$, the C—N vibration peak near 1,467 cm$^{-1}$, the C—C vibration peak near 1,417 cm$^{-1}$ and the C—H plane-in-vibration peak near 1,074 cm$^{-1}$, polypyrrole can be seen to have been synthesized.

Figure 5:
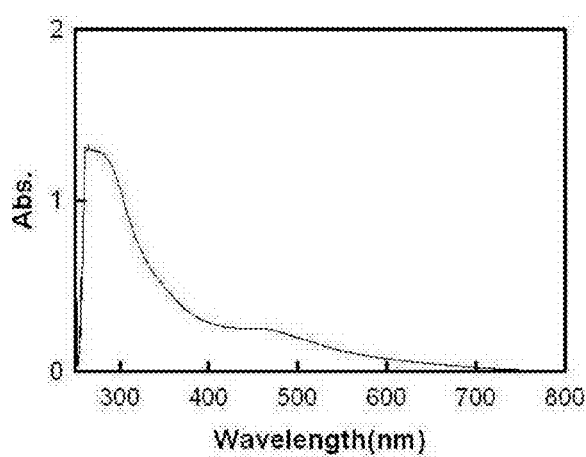
FIG. 5 is a UV-visible spectrum of base type polypyrrole (solvent: N-methylpyrrolidinone) obtained by neutralizing the conductive polypyrrole solution synthesized using the process of the present invention with ammonia water.

(2) The base type polypyrrole was dissolved in NMP, and the UV-visible spectrum of the base type polypyrrole was obtained using a UV-Visible spectrophotometer (FIG. 5).

As shown in FIG. 5, the base type polypyrrole appeared in the form of a very weak peak near 470 nm.

Figure 6:
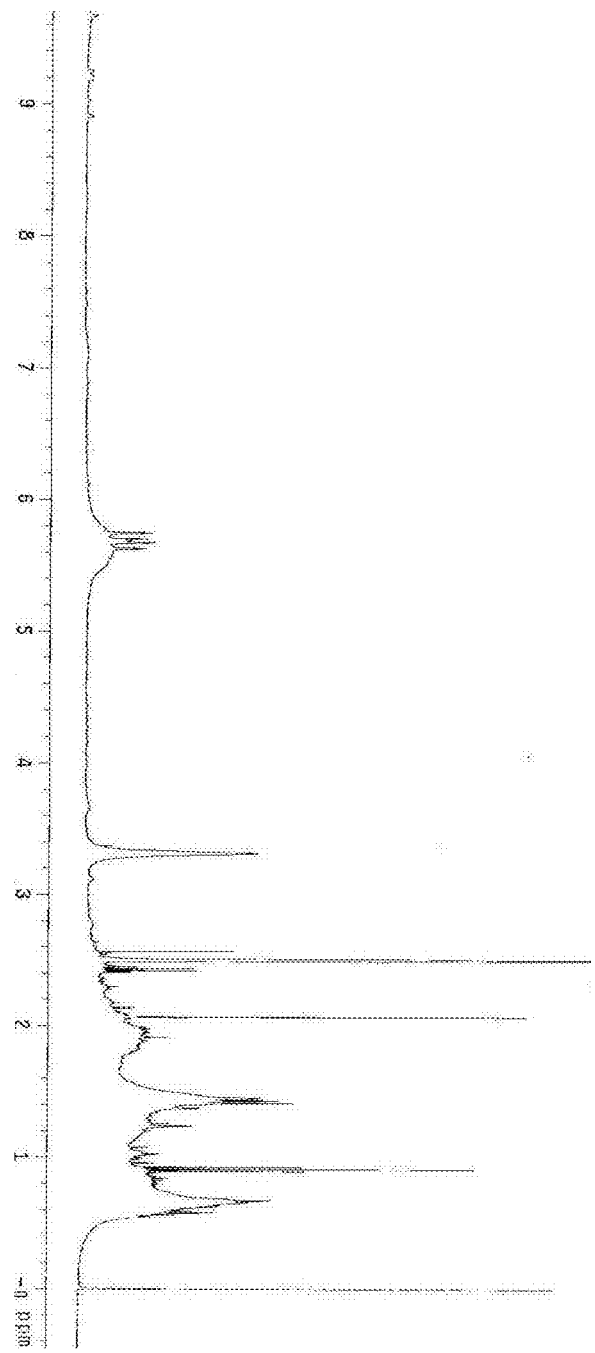
FIG. 6 is a graph showing the results of 500 MHz NMR analysis of base type polypyrrole obtained by neutralizing the conductive polypyrrole solution synthesized using the process of the present invention with ammonia water.

(3) The base type polypyrrole was dissolved in a DMSO solution, and the NMR spectrum as shown in FIG. 6 was obtained using 500 MHz NMR.

TEST EXAMPLE 3

Identification of Synthesized Conductive Polymer Polythiophene

Figure 7:
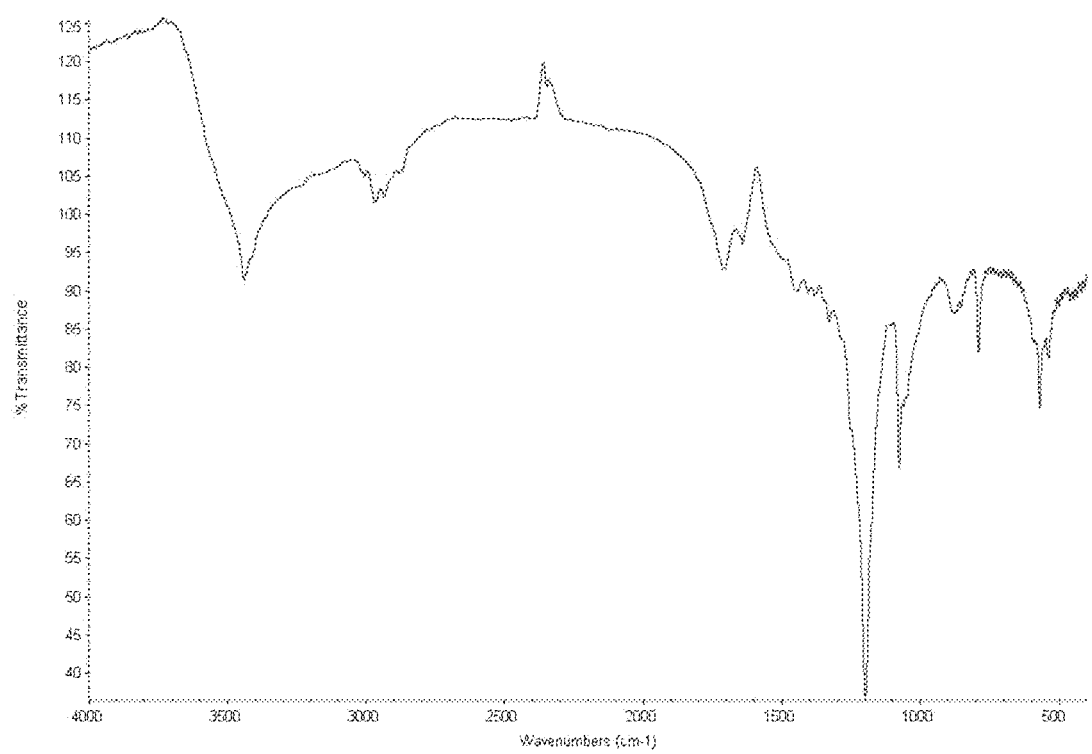
FIG. 7 is an FT-IR spectrum of base type polythiophene obtained by neutralizing a conductive polythiophene solution synthesized using the process of the present invention with ammonia water and then drying it.

The conductive polythiophene solution synthesized in (3) of Example 13 was neutralized with ammonia water and dried thus obtaining base type polythiophene, and the FT-IR spectrum of the base type polythiophene was obtained using an FT-IR spectrometer (FIG. 7).

As shown in FIG. 7, from the C—H stretching vibration peak near 3,066 cm$^{-1}$, and the C—H peak based on two specific ring stretching modes of thiophene at 791 cm$^{-1}$ and 785 cm$^{-1}$, polythiophene can be seen to have been synthesized.

Figure 8:
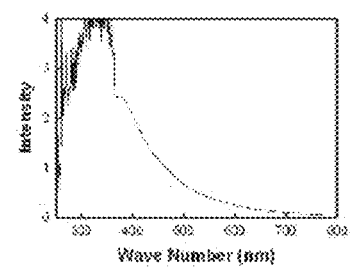
FIG. 8 is a UV-visible spectrum of base type polythiophene (solvent: N-methylpyrrolidinone) obtained by neutralizing the conductive polythiophene solution synthesized using the process of the present invention with ammonia water.

(2) The base type polythiophene was dissolved in NMP, and the UV-visible spectrum of the base type polythiophene was obtained using a UV-Visible spectrophotometer (FIG. 8).

As shown in FIG. 8, the base type polythiophene appeared in the form of an absorption peak near 385 nm.

Figure 9:
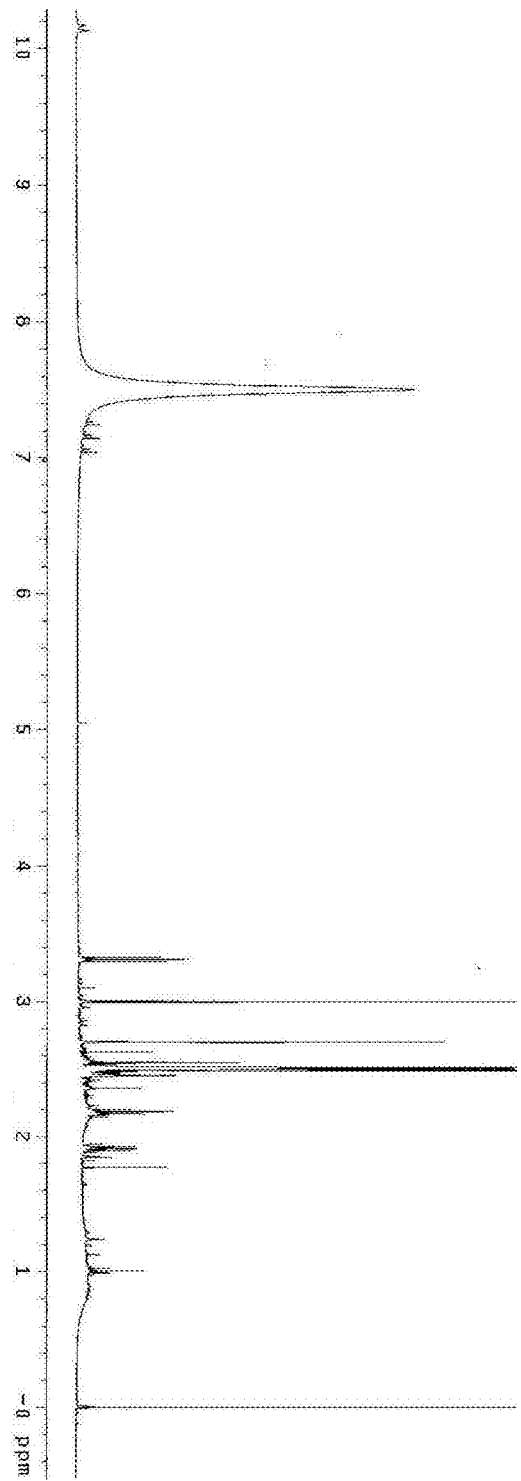
FIG. 9 is a graph showing the results of 500 MHz NMR analysis of base type polythiophene obtained by neutralizing the conductive polythiophene solution synthesized using the process of the present invention with ammonia water.

(3) The base type polythiophene was dissolved in a DMSO solution, and the NMR spectrum as shown in FIG. 9 was obtained using 500 MHz NMR.

TEST EXAMPLE 4

Measurement of Molecular Weight, Polydispersity and Solubility of Inventive Conductive Polymer Measurement of Molecular Weight and Polydispersity The conductive polymer solution prepared in the present invention was neutralized with ammonia water and dried thus obtaining a base type conductive polymer. The base type conductive polymer was dissolved in NMP-LiCl (0.5 wt %), and analyzed. The results are shown in Table 1 below (the molecular weight was measured using polystyrene as a standard material).

TABLE 1

| Conductive Polymer | Mw | Mn | Polydispersity | Mw at Initial Peak |
|---|---|---|---|---|
| Polyaniline (Ex. 2) | 1,527 | 1,011 | 1.51 | 12,043 |
| Polyaniline (Ex. 6, Oxidizer Twice Treatment) | 1,763 | 1,124 | 1.56 | 15,114 |
| Polypyrrole (Ex. 7) | 1,464 | 636 | 2.30 | 13,254 |
| Polypyrrole (Ex. 10) | 2,256 | 1,224 | 1.84 | 14,306 |
| Polypyrrole (Ex. 11, Oxidizer Twice Treatment) | 3,403 | 1,112 | 3.16 | 15,835 |

TABLE 1-continued

| Conductive Polymer | Mw | Mn | Polydispersity | Mw at Initial Peak |
|---|---|---|---|---|
| Polythiophene ((2) of Ex. 13) | 921 | 277 | 3.32 | 9,980 |
| Polythiophene ((3) of Ex. 13, Concentration, Oxidizer Twice Treatment) | 1,184 | 330 | 3.35 | 10,921 |

(2) Measurement of Solubility

The conductive polymers prepared in the present invention were respectively dissolved in dimethylsulfoxide, N-methylpyrrolidinone, and methylethylketone, and the solubility thereof was measured. The results are shown in Table 2 below.

TABLE 2

| Conductive Polymer | Dimethylsulfoxide | N-methyl-pyrrolidinone | Methyl-ethylketone |
|---|---|---|---|
| Polyaniline | 10 wt % or more | 10 wt % or more | 7 wt % or more |
| Polypyrrole | 10 wt % or more | 10 wt % or more | 6 wt % or more |
| Polythiophene | 9 wt % or more | 10 wt % or more | 6 wt % or more |

The invention claimed is:

1. A method of preparing a conductive polymer, comprising:
    dissolving a substituted or unsubstituted aniline monomer, substituted or unsubstituted pyrrole monomer, or substituted or unsubstituted thiophene monomer in an organic solvent, thus obtaining a monomer solution;
    adding water to the monomer solution in an amount ranging from more than 0 parts by weight to 2.08 parts by weight based on 100 parts by weight of the organic solvent;
    adding a dopant and an oxidizer to the monomer solution in a random sequence so that respective reactions occur, thus obtaining a reaction mixture; and
    filtering the reaction mixture, thus obtaining a conductive polymer solution, where the conductive polymer has a weight-average molecular weight of 5,000 or less when provided in a base type and has a solubility of 3 wt % or more in any organic solvent selected from the group consisting of methylethylketone, N-methylpyrrolidinone (NMP), and dimethylsulfoxide (DMSO).

2. The method according to claim 1, wherein when the dopant and the oxidizer are added, a catalyst and a doping adjuvant are further added.

3. The method according to claim 1, wherein when the dopant and the oxidizer are added, an addition reaction of the oxidizer is performed by adding a first oxidizer thus completing the reaction to thereby obtain a reaction product, filtering the reaction product thus obtaining a filtered solution, and adding to the filtered solution a second oxidizer having an oxidizing power stronger than that of the first oxidizer so that the reaction occurs.

4. The method according to claim 1, wherein the dopant is added within a range so that a molar ratio of the monomer of the conductive polymer to the dopant is 0.125~4.00.

5. The method according to claim 1, wherein the organic solvent comprises one or more selected from the group consisting of methylethylketone, chloroform, dichloromethane, N-methylpyrrolidinone (NMP), dimethylsulfoxide (DMSO), dimethylformamide (DMF), methanol, ethanol, propanol, butanol, t-butyl alcohol, isopropylalcohol (iPA, 2-propanol), benzyl alcohol, tetrahydrofuran (THF), ethyl acetate, butyl acetate, propyleneglycol diacetate, propyleneglycol methyl ether acetate (PGMEA), formic acid, acetic acid, trifluoroacetic acid, acetonitrile, trifluoroacetonitrile, ethylene glycol, dimethylacetamide (DMAC), DMAC-LiCl, N,N'-1,3-dimethyl-3,4,5,6-tetrahydro-2(1H)-pyrimmidinone (N,N'-1,3-dimethylpropyleneurea, DMPU), morpholine, pyridine, and pyrrolidine.

6. The method according to claim 5, wherein the organic solvent is methylethylketone.

7. The method according to claim 1, wherein the dopant comprises one or more selected from the group consisting of sulfuric acid, hydrochloric acid, phosphoric acid, chlorosulfonic acid, methane sulfonic acid, sulfamic acid, nitric acid, dodecylbenzenesulfonic acid, camphor sulfonic acid, toluene sulfonic acid, naphthalene sulfonic acid, formic acid, polystyrenesulfonic acid, benzenesulfonic acid, oxalic acid, diphenyl p-sulfonic acid, and benzoic acid.

8. The method according to claim 1, wherein the oxidizer comprises one or more selected from the group consisting of ammonium persulfate, ammonium iron(III) sulfate, iron(III) sulfate, iron(III) chloride, iron(III) perchlorate, iron(III) p-toluenesulfonate, potassium permanganate, potassium dichromate, and iron(III) tritoluenesulfonate ($Fe(OTs)_3$).

9. The method according to claim 3, wherein the first oxidizer or the second oxidizer comprises one or more selected from the group consisting of ammonium persulfate, ammonium iron(III) sulfate, iron(III) sulfate, iron(III) chloride, iron(III) perchlorate, iron(III) p-toluenesulfonate, potassium permanganate, potassium dichromate, and iron(III) tritoluenesulfonate ($Fe(OTs)_3$).

10. The method according to claim 6, wherein the monomer solution comprises aniline monomers, wherein the dopant comprises sulfuric acid, and wherein the oxidizer comprises ammonium persulfate.

11. The method according to claim 1, wherein water is added to the monomer solution in an amount ranging from more than 0 parts by weight to 1 part by weight based on 100 parts by weight of the organic solvent.

* * * * *